United States Patent
Fang et al.

(10) Patent No.: US 7,598,426 B2
(45) Date of Patent: Oct. 6, 2009

(54) SELF-LUBRICATING DIESEL FUEL AND METHOD OF MAKING AND USING SAME

(75) Inventors: Jiafu Fang, Spring, TX (US); Selda Gunsel, The Woodlands, TX (US)

(73) Assignee: Shell Oil Company, Houston, TX (US)

( * ) Notice: Subject to any disclaimer, the term of this patent is extended or adjusted under 35 U.S.C. 154(b) by 218 days.

(21) Appl. No.: 10/488,820

(22) PCT Filed: Sep. 6, 2002

(86) PCT No.: PCT/US02/28344

§ 371 (c)(1),
(2), (4) Date: Mar. 5, 2004

(87) PCT Pub. No.: WO03/022960

PCT Pub. Date: Mar. 20, 2003

(65) Prior Publication Data

US 2004/0250466 A1    Dec. 16, 2004

(51) Int. Cl.
*C10L 1/18* (2006.01)
(52) U.S. Cl. .......................... 585/14; 44/388
(58) Field of Classification Search ........... 585/734, 585/733, 737, 14
See application file for complete search history.

(56) References Cited

U.S. PATENT DOCUMENTS

| | | | |
|---|---|---|---|
| 4,675,102 A | 6/1987 | Wolowski et al. | 208/400 |
| 4,746,420 A | 5/1988 | Darian et al. | 208/222 |
| 5,068,025 A | 11/1991 | Bhan | 208/57 |
| 5,284,492 A | 2/1994 | Dubin | 44/301 |
| 5,321,172 A | 6/1994 | Alexander et al. | 585/2 |
| 5,484,462 A | 1/1996 | Herbstman | 44/334 |
| 5,490,864 A | 2/1996 | Herbstman et al. | 44/379 |
| 5,492,544 A | 2/1996 | Farng et al. | 44/331 |
| 5,505,867 A | 4/1996 | Ritter | 252/18 |
| 5,529,706 A | 6/1996 | Farng et al. | 252/51.5 |
| 5,611,912 A | 3/1997 | Han et al. | 208/58 |
| 5,630,852 A | 5/1997 | Placek | 44/379 |
| 5,689,031 A | 11/1997 | Berlowitz et al. | 585/734 |
| 5,743,922 A | 4/1998 | Peter-Hoblyn et al. | 44/301 |
| 5,853,436 A | 12/1998 | Cherpeck | 44/412 |

(Continued)

FOREIGN PATENT DOCUMENTS

| EP | 0635558 | 1/1995 |
|---|---|---|
| WO | WO-03-022960 A3 | 3/2003 |

OTHER PUBLICATIONS

European Patent Office, "PCT Notification of Transmittal of the International Preliminary Examination Report," PCT/US02/28344, Dec. 9, 2003, 10 pages.

*Primary Examiner*—Cephia D Toomer

(57) ABSTRACT

A diesel fuel comprising a mixture of normal paraffins and branched paraffins. The normal paraffins present in the diesel fuel is less than about 99% by weight; and the aromatic content in the diesel fuel is less than about 10% by weight. The diesel fuel has a cetane number of at least 40 and a sulfur content of less than about 100 ppm. Optionally, the diesel fuel may further include cycloparaffins, i.e., naphthenes. To increase the lubricity of the diesel fuel, a lubricity additive, such as fatty acid methyl ester, can be added to the diesel fuel.

33 Claims, 1 Drawing Sheet

Changes in Cetane Number & Index with n-paraffin content

U.S. PATENT DOCUMENTS

| | | | |
|---|---|---|---|
| 5,855,629 A | 1/1999 | Grundy et al. | 44/400 |
| 5,880,072 A | 3/1999 | Furey et al. | 508/263 |
| 5,880,075 A | 3/1999 | Hartley et al. | 508/501 |
| 5,882,364 A | 3/1999 | Dilworth | 44/400 |
| 5,891,203 A | 4/1999 | Ball et al. | 44/388 |
| 5,931,977 A | 8/1999 | Yang | 44/320 |
| 5,958,089 A | 9/1999 | Dillworth et al. | 44/347 |
| 5,968,211 A | 10/1999 | Schilowitz | 44/402 |
| 5,993,498 A | 11/1999 | Vrahopoulou et al. | 44/388 |
| 5,997,592 A | 12/1999 | Lin et al. | 44/385 |
| 5,997,593 A | 12/1999 | McDonnell et al. | 44/421 |
| 6,051,039 A | 4/2000 | Sugimoto | 44/341 |
| 6,054,420 A | 4/2000 | Hartley et al. | 508/485 |
| 6,096,103 A | 8/2000 | Hubbard et al. | 44/300 |
| 6,110,237 A * | 8/2000 | Spencer et al. | 585/14 |
| 6,150,575 A * | 11/2000 | Angevine et al. | 585/14 |
| 6,222,082 B1 | 4/2001 | Hubbard et al. | 585/14 |
| 6,833,064 B2 * | 12/2004 | Berlowitz et al. | 208/15 |

* cited by examiner

SELF-LUBRICATING DIESEL FUEL AND METHOD OF MAKING AND USING SAME

FIELD OF THE INVENTION

The invention relates to a diesel fuel composition and a method of making and using the diesel fuel composition.

BACKGROUND OF THE INVENTION

Diesel engines are well known for being highly durable and fuel efficient. Because of the durability and fuel efficiency, diesel engines have long been used in heavy-duty motor vehicles, such as trucks, buses and locomotives.

Historically, diesel engines have been operated on a petroleum-derived liquid hydrocarbon fuel boiling in the range of about 300° F. to about 750° F. (149° C.-399° C.). Generally, a diesel fuel is a mixture of normal paraffins, branched paraffins, cycloparaffins (i.e., naphthenes), olefins, and aromatics. The aromatic content in a typical diesel fuel is in the range of about 20% to 45% by weight. Studies have shown that diesel fuels with a high aromatic content are prone to emit pollutants upon combustion. The pollutants include, for example, solid particulate matter (e.g., soot) as well as gaseous pollutants (e.g., unburned hydrocarbons, carbon monoxide, and nitrogen oxides). Minimizing the production of pollutants from vehicles operating with diesel fuels is important for both environmental and health reasons. Ever increasingly stringent specifications are being adopted in order to reduce pollutant emissions from diesel fuels. In California, for example, starting in October, 1993, the California Air Resources Board (CARB) mandated a maximum aromatics content for commercial diesel fuels of 10 volume percent (9.5 wt. %).

In addition to a relatively high aromatic content, a majority of diesel fuels also have a sulfur content on the order of several hundred parts per million or more. The presence of sulfur in diesel fuels constitutes a serious environmental hazard. Hence, strict regulations limiting the amount of sulfur which may be present in such fuels have been introduced. Unfortunately, most currently available fuels with a suitably low sulfur content exhibit poor inherent lubricity, and this can lead to problems when the fuel is used. For example, the use of low sulfur fuel in diesel engines frequently results in damage to the fuel injector pump which relies on the natural lubricating properties of the fuel to prevent component failure.

For the foregoing reasons, there is a need for a diesel fuel composition which has a lower aromatic content and a lower sulfur content. It would be desirable that this diesel fuel composition possess the requisite properties for use in a diesel engine.

SUMMARY OF THE INVENTION

The embodiments of the invention meet the above need by providing a diesel fuel composition which includes a mixture of hydrocarbons, e.g., normal paraffins and branched paraffins. The normal paraffins present in the diesel fuel is less than about 99% by weight; and the aromatic content in the diesel fuel is less than about 10% by weight. The diesel fuel has a cetane number of at least 40 and a sulfur content of less than about 100 ppm. Various aspects of the invention and advantages provided by the embodiments of the invention are apparent with the following description.

DESCRIPTION OF EMBODIMENTS OF THE INVENTION

Figure 1:
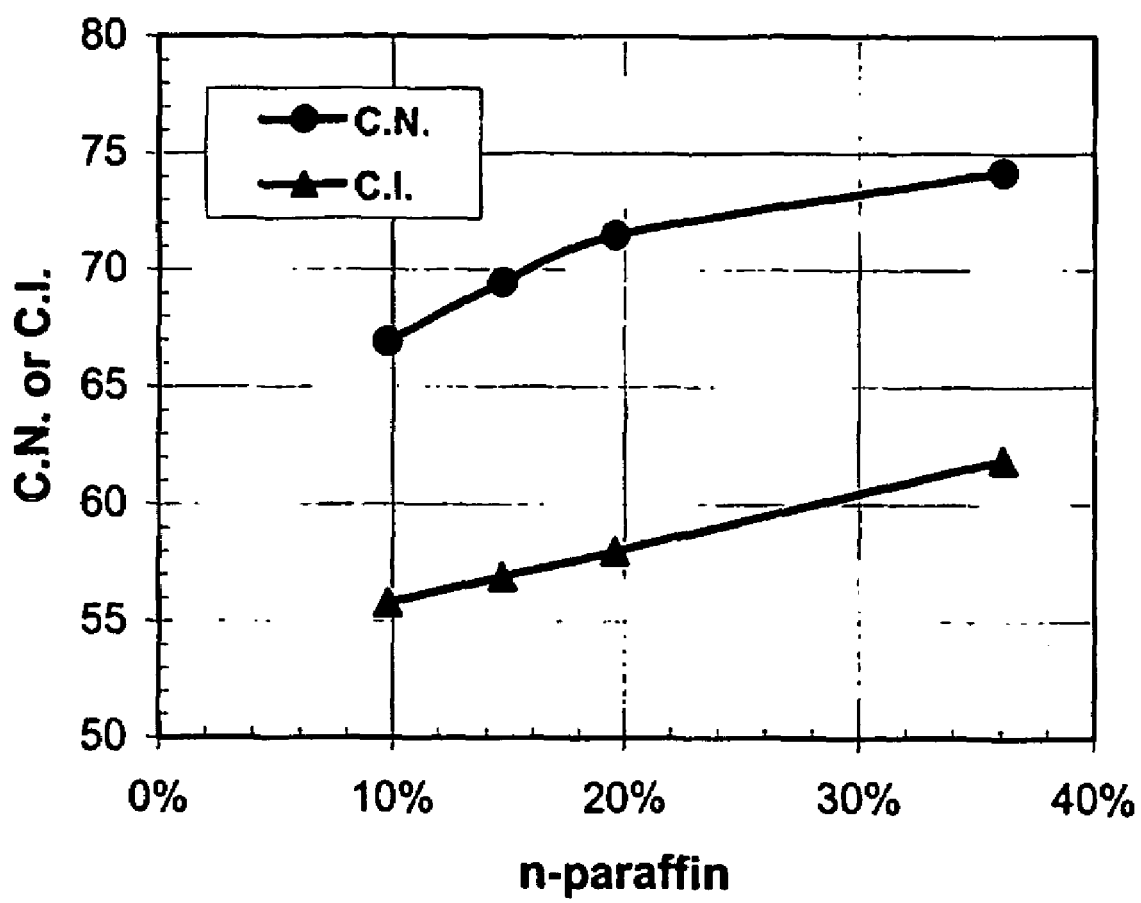
FIG. 1 is a graphical representation of the relationship between Cetane Number and Cetane Index and paraffinic content in diesel fuel.

Embodiments of the invention provide a diesel fuel with an aromatic content of less than about 10% by weight and a sulfur content of less than about 100 ppm. The diesel fuel is a mixture of hydrocarbons, e.g., normal paraffins and branched paraffins, provided that the normal paraffins, if present, in the diesel fuel is less than about 99% by weight. Generally, the diesel fuel has a cetane number of at least 40. Preferably, the diesel fuel has a higher cetane number, such as 45, 50, 55, 60, 65, 70, and 75 or higher. In some embodiments, the cetane number of the diesel fuel is between about 50 and about 80. It is noted that the cetane number is measured in accordance with ASTM D 613, although other accepted methods known in the art can be used.

One characteristic of the diesel fuel in accordance with embodiments of the invention is the relatively lower aromatic content in the diesel fuel. Generally, the diesel fuel has an aromatic content of less than 10% by weight. Preferably, the aromatic content is less than about 8% by weight, more preferably less than about 5% by weight, and most preferably less than about 3% by weight of the diesel fuel. In some embodiments, the aromatic content of the diesel fuel can be between about 0.5% to about 9% by weight. Aromaticity, i.e., the aromatic content, is measured in accordance with ASTM D 1319, although other accepted methods known in the art can also be used.

Another characteristic of the diesel fuel in accordance with embodiments of the invention is its relatively lower sulfur content. Generally, the sulfur content of the diesel fuel in accordance with embodiments of the invention is less than about 100 ppm, although in some embodiments the sulfur content may be as high as about 150 ppm to about 200 ppm. In preferred embodiments, the sulfur content is less than about 80 ppm. More preferably, the sulfur content is less than about 50 ppm. In some embodiments, the sulfur content of the diesel fuel may be less than about 20 ppm, about 10 ppm, or about 5 ppm. From an environmental perspective, it is more desirable to obtain a diesel fuel with a sulfur content of less than about 5 ppm; however, the cost of manufacturing such a diesel fuel may be significantly higher. Nevertheless, embodiments of the invention can provide a diesel fuel with a sulfur content of significantly less than 1 ppm, if desired. It is noted that the sulfur content is measured in accordance with ASTM D 2622, although other accepted methods known in the art can also be used.

In addition to the aforementioned characteristics, the diesel fuel in accordance with embodiments of the invention may have one or more of the following properties as shown in Table I.

TABLE I

| Physical Property | Testing Method | Preferred Range | More Preferred Range | Most Preferred Range |
|---|---|---|---|---|
| Flash Point ° F., PMCC | ASTM D 93 | >100 | >130 | >140 |
| Cetane Number | ASTM D 613 | 40-75 | 50-75 | 60-75 |
| Cloud Point, ° F. | ASTM D 2500 | <32 | <10 | <0 |
| Cold Filter Plugging Point, ° F. | IP309* | <32 | <10 | <0 |
| Pour Point, ° F. | ASTM D 97 | <32 | <10 | <0 |
| Viscosity @ 40° C., cSt | ASTM D 445 | 1.32-4.10 | 1.40-4.00 | 1.50-3.50 |
| Friction of Coefficient HFRR @ 60° C. | ASTM D 6079 | <0.3 | <0.25 | <0.15 |
| Average Wear Scar, HFRR @ 60° C., μm | ASTM D 6079 | <500 | <400 | <300 |

*IP stands for The Institute of Petroleum (England)

It should be noted that the above table describes the characteristics of some embodiments of the diesel fuel. Not all embodiments of the diesel fuel need to possess one or more of the physical characteristics. Moreover, the physical characteristics outside the preferred ranges are still within the scope of the invention as described and claimed herein.

Generally, the diesel fuel in accordance with embodiments of the invention is a mixture of hydrocarbon compounds, so long as the diesel fuel has an aromatic content of less than 10% by weight and a sulfur content of less than 100 ppm by weight. Various types of hydrocarbons may be present in the diesel fuel. For example, the diesel fuel can be a mixture of normal paraffins and branched paraffins. In addition, the diesel fuel may include cycloparaffins, i.e., naphthenes. Normal paraffins refer to alkanes (which are composed of hydrogen and carbon) with a straight carbon chain. In contrast, branched paraffins refer to alkanes with a branched carbon chain. Cycloparaffins refer to alkanes in which carbon atoms are bonded to each other in a cyclic manner. Although the diesel fuel in accordance with embodiments of the invention preferably is a mixture of normal paraffins and branched paraffins, other hydrocarbon compositions are also acceptable. For example, a diesel fuel can also be made from pure normal paraffins, pure branched paraffins, pure cycloparaffins, or any combination thereof, so long as the requirements for the diesel fuel specified herein are met by these compositions. In embodiments where the diesel fuel include normal paraffins, the normal paraffin content may be less than about 50%, 60%, 70%, 80%, 95%, 97% or 99% by weight. As to branched paraffins and cycloparaffins, any amount which results in the desired property of the diesel fuel is acceptable. Table II in the following indicates various compositions of diesel fuels in accordance with embodiments of the invention.

TABLE II

| Component | Preferred Range (wt. %) | More Preferred Range (wt. %) | Most Preferred Range (wt. %) |
|---|---|---|---|
| Normal Paraffin | 0-100 | 20-90 | 30-80 |
| Branched Paraffin | 0-100 | 0-50 | 0-20 |
| Cycloparaffin | 0-100 | 0-50 | 0-20 |
| Aromatics | ≦10 | ≦5 | ≦3 |
| Olefin | 0-100 ppm | 0-50 ppm | 0-20 ppm |

The diesel fuel in accordance with embodiments of the invention can be made by a variety of methods. For example, some hydrocarbon fluids or solvents can be used directly as a diesel fuel, provided that they meet the diesel specifications and the requirements set forth herein. In some embodiments, the diesel fuel is obtained by blending two or more hydrocarbon fluids or solvents to obtain the desired properties. For example, substantially pure normal paraffins can be mixed with a low aromatic content hydrocarbon fluid or solvent to obtain a desired diesel fuel. Substantially pure normal paraffins can be obtained from Exxon Chemical, Houston, Tex. under the trade name of Norpar®, such as Norpar® 12, Norpar® 13, Norpar® 14, and Norpar® 15. Table III in the following lists representative physical properties of selected Norpar® solvents.

TABLE III

| Properties | Test Method | Norpar ® 12 | Norpar ® 13 | Norpar ® 14 | Norpar ® 15 |
|---|---|---|---|---|---|
| Aniline Point, (° C.) | ASTM D 611 | 80 (min.) | 82 (min.) | N/A | 82 (min.) |
| Aromatic Content (wt. %) | AM-S 140-31 | 0.03 (max.) | 0.03 (max.)* | 0.03 (max.)* | N/A |
| Distillation | ASTM D 86 | | | | |
| IBP (° C.) | | 185 (min.) | 221 (min.) | 230 (min.) | 240 (min.) |
| DP (° C.) | | 221 (max.) | 248 (max.) | 261 (max.) | 292 (max.) |
| Flash Point (° C.) | ASTM D 93 | 66 (min.) | 93 (min.) | 93.5 (min.) | 97 (min.) |
| Normal Paraffin Content (wt. %) | CPL C-349 | 97 (min.) | 97 (min.) | 97 (min.) | 97 (min.) |
| Specific Gravity @ 15.6/15.6° C. | ASTM D 4052 | 0.748-0.755 | 0.760-0.766 | 0.762-0.772 | 0.760-0.785 |
| Sulfur Content (wppm) | ASTM D 4045 | 5 (max.) | 5 (max.) | N/A | 12 (max.) |
| Average Molecular Weight | | 163 | 189 | 197 | 212 |
| Major Component | | $C_{11}$-$C_{12}$ | $C_{13}$-$C_{14}$ | $C_{13}$-$C_{16}$ | $C_{14}$-$C_{16}$ |

*measured in accordance with CPL C-705.

It is noted that other normal paraffin solvents from Exxon and solvents from other manufacturers of normal paraffins can also be used in embodiments of the invention.

There are many hydrocarbon fluids or solvents which have a low aromatic content. Any of these solvents or fluids can be used to manufacture the diesel fuel in accordance with embodiments of the invention by using them directly or blending them with one or more additional components. One example of such a hydrocarbon solvent with a low aromatic content is available from Penreco, Houston, Tex. under the trade name of Magiesol®, such as Magiesol® 40, Magiesol® 45, Magiesol® 47, Magiesol® 52, Magiesol® 55, Magiesol® 60, and Magiesol® 62. Some physical properties of selected Magiesol® solvents are listed in Table IV.

TABLE IV

| Property | Magiesol® 40 | Magiesol® 44 | Magiesol® 47 | Magiesol® 52 | Magiesol® 55 | Magiesol® 60 | Magiesol® 62 |
|---|---|---|---|---|---|---|---|
| Composition | | | | | | | |
| Aromatic carbon atom % | 0.3 | 0.7 | 0.8 | 0.1 | 0.5 | 0.5 | |
| Naphthenic carbon atom % | 42.1 | 39.1 | 37.0 | 35.7 | 33.8 | 33.2 | 35.9 |
| Paraffinic carbon atom % | 57.6 | 60.2 | 62.2 | 64.2 | 65.7 | 66.3 | 64.1 |
| Aromatic content (wt. %) | 0.5 | 0.9 | 0.8 | 0.5 | 1.4 | 1.4 | 0.01 |
| Average molecular weight | 178 | 199 | 203 | 236 | 248 | 266 | 319 |
| Distillation, °F. | | | | | | | |
| IBP | 390 | 440 | 465 | 515 | 515 | 565 | 570 |
| 5% | 400 | 445 | 473 | 523 | 530 | 580 | 595 |
| 50% | 415 | 453 | 486 | 535 | 572 | 610 | 635 |
| 95% | 430 | 466 | 512 | 560 | 620 | 678 | 698 |
| Endpoint | 455 | 490 | 530 | 585 | 645 | 690 | 710 |
| Viscosity, cSt | | | | | | | |
| @40° C. | 1.25 | 1.76 | 2.37 | 3.85 | 4.76 | 6.68 | 8.18 |
| @100° C. | 0.78 | 0.91 | 1.07 | 1.44 | 1.66 | 2.06 | 2.31 |
| Flashpoint, °F. | 165 | 200 | 215 | 260 | 275 | 305 | 310 |
| Pour point, °F. | −40 | −15 | 0 | 25 | 35 | 50 | 15 |
| Specific gravity, 60° F. | 0.79 | 0.80 | 0.80 | 0.81 | 0.82 | 0.83 | 0.84 |

In addition to blending one or more hydrocarbon fluids or solvents, the diesel fuel in accordance with embodiments of the invention can also be made from regular diesel fuels. Generally, regular diesel fuels have an aromatic content above 20 wt. % and a sulfur content of several hundred parts per million or more. They may further include additional oxygen and/or nitrogen impurities. To obtain the desired diesel fuel, a regular diesel fuel undergoes a conversion step in which the aromatic hydrocarbons present in the regular diesel fuel are converted to non-aromatic hydrocarbons, such as cycloparaffins. This is typically achieved by hydrogenating the regular diesel fuel in the presence of a hydrogenation catalyst. Other conversion processes may also be used. To reduce the sulfur content, a desulfurization process is used. Any desulfurization method can be used in embodiments of the invention. If necessary, additional steps which remove oxygen and/or nitrogen can also be employed to obtain the desired diesel fuel. U.S. Pat. Nos. 5,611,912, 5,068,025, 4,746,420, and 4,675,102 disclose hydrogenation and/or desulfurization processes which may be used in embodiments of the invention. The disclosures of all of the preceding patents are incorporated by reference herein in their entirety.

The diesel fuel in accordance with embodiments of the invention may further include one or more additives. Such additives include, but are not limited to, detergents, dispersants, cetane improvers, antioxidants, carrier fluids, metal deactivators, dyes, markers, corrosion inhibitors, anti-static additives, drag reducing agents, demulsifiers, dehazers, anti-icing additives, combustion improvers, and lubricity additives. The following U.S. patents disclose various additives that can be employed in embodiments of the invention as additives: U.S. Pat. Nos. 6,054,420; 6,051,039; 5,997,593; 5,997,592; 5,993,498; 5,968,211; 5,958,089; 5,931,977; 5,891,203; 5,882,364; 5,880,075; 5,880,072; 5,855,629; 5,853,436; 5,743,922; 5,630,852; 5,529,706; 5,505,867; 5,492,544; 5,490,864; 5,484,462; 5,321,172; and 5,284,492. The disclosures of all of the preceding U.S. patents are incorporated by reference herein in their entirety.

In some embodiments, to increase the diesel fuel lubricity, one or more lubricity enhancing additives are mixed with the diesel fuel. Typically, the concentration of the lubricity enhancing additive in the fuel falls in the range of from about 1 to about 50,000 ppm, preferably about 10 to about 20,000 ppm, and more preferably from about 25 to about 10,000 ppm. Any lubricity enhancing additives can be used. A preferred class of lubricity enhancing additives is esters of fatty acids as represented by the following formula:

wherein $R_1$ and $R_2$ are individually a hydrocarbyl group. Preferably, $R_1$ is a $C_{12}$-$C_{22}$ alkyl group; and $R_2$ is a $C_1$-$C_5$ alkyl group. In particular, fatty acid methyl ester and fatty acid ethyl ester are preferred lubricity enhancing additives.

The diesel fuel in accordance with embodiments of the invention has a relatively lower odor than regular diesel fuel. The low amounts of aromatics and sulfur account for little to no smell of the formulation and would be desirable to consumers.

It is noted that the diesel fuel in accordance with embodiments of the invention can be used as a regular diesel fuel or an emergency diesel fuel. As regular diesel fuel, it can be added to the fuel tank of a diesel vehicle, which in turn is delivered to the diesel engine. Upon combustion, the diesel fuel provides energy to the vehicle. Alternatively, the diesel fuel in accordance with embodiments of the invention can be used as emergency fuel. The term "emergency fuel" refers to a fuel which is generally stored in a container other than the gas tank of a vehicle. The fuel should be stable over an extended period of time, for example, six to twelve months. When the vehicle runs out of fuel, the emergency fuel is added to the gas tank of the vehicle and provides fuel to the vehicle. Because the flash point of the diesel fuel made in accordance with embodiments of the invention generally exceeds 140° F., it can be safely stored in the trunk of a diesel vehicle. The diesel fuel can also be used as an alternative fuel as described in U.S. Pat. No. 6,096,103, which is incorporated by reference herein in its entirety.

The following examples exemplify embodiments of the invention. They do not limit the invention as otherwise described and claimed herein. All numbers in the examples are approximate values.

EXAMPLE 1

A diesel fuel composition was produced by mixing the following ingredients together in the specified amounts:

| Ingredient | Wt % |
|---|---|
| Norpar ® 13 | 36.11 |
| Magiesol ® 40 | 61.89 |
| fatty acid methyl ester | 2.00 |
| Total | 100.00 |

The diesel fuel was subjected to the ASTM D613 test for cetane number and the ASTM D976 test for cetane index. Example 1 produced a cetane number of 74.2 and a cetane index of 61.9. Commercial diesel fuels have cetane numbers and cetane indexes ranging from 40 to 5, typically. Example 1 and several commercial diesel fuels, were tested according to various ASTM and standard methods. The results are given below:

| Property | ASTM or other | Example 1 | Chevron | Mobil | Stop-n-go | Texaco |
|---|---|---|---|---|---|---|
| Flash point, ° F., PMCC | D 93 | 173 | 135 | 164 | 170 | 137 |
| Cloud point, ° F. | D 2500 | −20 | 7 | 5 | 12 | 4 |
| Cold filter plugging point, ° F. | IP 309* | −20 | 10 | 6 | 14 | −2 |
| Sulfur content, ppm | D 2622 | 3 | 369 | 254 | 343 | N/A |
| Aromatics content, % | SFC** | 2 | 35 | 35 | 41 | N/A |
| Lubricity, HFRR @60° C. | D 6079 | 0.11 | 0.22 | 0.20 | 0.28 | 0.30 |
| Wear Scar, HFRR @60° C., μm | D 6079 | 220 | 545 | 465 | 530 | 645 |

*The Institute of Petroleum (England).
**Supercritical fluid chromatography.
N/A—Not available The diesel fuel of Example 1 has relatively lower sulfur content, lower aromatic content, lower wear, and higher fuel lubricity when compared to commercially available diesel fuel. The formula of Example 1 should burn cleaner than a typical commercial diesel fuel and should emit less soot and particulates to the environment.

EXAMPLE 2

A diesel fuel composition was produced by mixing the following ingredients together in the specified amounts:

| Ingredient | Wt % |
|---|---|
| Norpar ® 13 | 14.7 |
| Magiesol ® 40 | 83.3 |
| fatty acid methyl ester | 2.00 |
| Total | 100.00 |

Example 2 was tested according to various ASTM and standard methods. The results are given below:

| Property | ASTM or other | Result |
|---|---|---|
| Cetane number | D 613 | 70 |
| Cetane index | D 976 | 57 |
| Flash point, ° F., PMCC | D 93 | 170 |
| Cloud point, ° F. | D 2500 | −32 |
| Cold filter plugging point, ° F. | IP 309 | −44 |
| Pour point, ° F. | D 97 | −30 |
| Sulfur content, ppm | D 2622 | 4 |
| Aromatics content, % | SFC | 2 |
| Lubricity, HFRR @60° C. | D 6079 | 0.11 |
| Wear Scare, HFRR @60° C., μm | D 6079 | 210 |

The low temperature properties of Example 2 allow diesel engines to start at lower ambient temperatures. In general, the higher the normal paraffin content, the higher the cetane number (CN) and index (CI). FIG. 1 shows the relationship between CN and CI and paraffinic content in diesel fuel.

EXAMPLE 3

A diesel fuel composition was produced by mixing the following ingredients together in the specified amounts:

| Ingredient | Wt % |
|---|---|
| Norpar ® 15 | 50.0 |
| Magiesol ® 40 | 50.0 |
| Total | 100.00 |

The fuel has a cetane number greater than 74.8 and allows a diesel engine to run smoothly.

EXAMPLE 4

A diesel fuel composition was produced by mixing the following ingredients together in the specified amounts:

| Ingredient | Wt % |
|---|---|
| Norpar ® 13 | 80.0 |
| Magiesol ® 40 | 15.0 |
| fatty acid methyl ester | 5.0 |
| Total | 100.00 |

The fuel has a cetane number greater than 74.8 and its fuel lubricity is excellent.

EXAMPLE 5

A diesel fuel composition was produced by mixing the following ingredients together in the specified amounts:

| Ingredient | Wt % |
| --- | --- |
| Norpar ® 13 | 20.0 |
| Conosol ® 130 | 78.0 |
| fatty acid methyl ester | 2.0 |
| Total | 100.00 |

The fuel has a cetane number greater than 65 and its low temperature performance is excellent.

As demonstrated above, embodiments of the invention provide a diesel fuel which has a relatively lower aromatic content and a relatively lower sulfur content. As a result, pollutants generated from the combustion of the diesel should be reduced. Moreover, the diesel fuel may have one or more of the following advantages: higher cetane number, higher cetane index, higher flash point, lower cold filter plugging point, lower pour point, lower odor, lower friction coefficient, and increased lubricity. Additional characteristics and advantages provided by embodiments of the invention are apparent to those skilled in the art.

While the invention has been described with reference to a limited number of embodiments, variations and modifications therefrom exist. For example, the diesel fuel need not be a mixture of normal paraffins and branched paraffins. It can comprise any type of hydrocarbons, so long as the aromatic content in the diesel fuel is less than about 10% by weight and the sulfur content is less than about 100 ppm. While it is preferred that the diesel fuel have an aromatic content of less than about 10% by weight and a sulfur content of less than about 100 ppm, a diesel fuel with an aromatic content greater than 10% by weight and/or a sulfur content higher than 100 ppm is also acceptable for some purposes. It should be noted that the application of the diesel fuel is not limited to diesel engines; it can be used in any equipment which requires a diesel fuel, such as an emergency generator. Although it is a regulatory requirement that all diesel fuels have a cetane number of at least 40, not all diesel fuels in accordance with embodiments of the invention need to meet this regulatory requirement. In other words, diesel fuels with a cetane number of less than 40 are also acceptable. It is noted that the methods for making and using the diesel fuel are described with reference to a number of steps. These steps can be practiced in any sequence. One or more steps may be omitted or combined but still achieve substantially the same results. The appended claims intend to cover all such variations and modifications as falling within the scope of the invention.

What is claimed is:

1. A self-lubricating diesel fuel composition comprising primarily paraffins, the composition comprising:
    a quantity of one or more normal paraffins;
    a sulfur content of about 200 ppm or less;
    a flashpoint of greater than 140° F.; and,
    an aromatic content of from about 0.5% to less than about 9% by weight of the self-lubricating diesel fuel composition;
    wherein the quantity of one or more normal paraffins is (a) sufficient to produce a cetane number of 40 or more but (b) less than about 99% by weight of the self-lubricating diesel fuel composition;
    wherein the self-lubricating diesel fuel composition exhibits a coefficient of friction of less than 0.3 when tested using a high frequency reciprocating test rig at 60° C.

2. The self-lubricating diesel fuel composition of claim 1 exhibiting a coefficient of friction of less than 0.25 when tested using a high frequency reciprocating test rig at 60° C.

3. The self-lubricating diesel fuel composition of claim 1 exhibiting a coefficient of friction of less than 0.15 when tested using a high frequency reciprocating test rig at 60° C.

4. The self-lubricating diesel fuel composition of claim 1 wherein the sulfur content is less than about 100 ppm.

5. The self-lubricating diesel fuel composition of claim 1 wherein the quantity of one or more normal paraffins is sufficient to produce a cetane number of about 65 or higher.

6. The self-lubricating diesel fuel composition of claim 1 wherein the quantity of one or more normal paraffins is sufficient to produce a cetane number of about 70 or higher.

7. The self-lubricating diesel fuel composition of claim 1 wherein the quantity of one or more normal paraffins is sufficient to produce a cetane number of up to about 80.

8. The self-lubricating diesel fuel composition of claim 1 comprising:
    a cloud point of less than 10° F.;
    a pour point of less tan 10° F.; and,
    a cold filter plugging point of less than about 10° F.

9. The self-lubricating diesel fuel composition of claim 1 comprising:
    a cloud point of less than 0° F.;
    a pour point of less than 0° F.; and,
    a cold filter plugging point of less than about 0° F.

10. The self-lubricating diesel fuel composition of claim 1 wherein the aromatic content is less than about 8% by weight of the diesel fuel composition.

11. The self-lubricating diesel fuel composition of claim 1 wherein the aromatic content is less than about 3% by weight of the diesel fuel composition.

12. The self-lubricating diesel fuel composition of claim 1 wherein the quantity of one or more normal paraffins is 20% by weight or more.

13. The self-lubricating diesel fuel composition of claim 1 wherein the quantity of one or more normal paraffins is 30% by weight or more.

14. A method for protecting a fuel injector pump when operating an engine using a diesel fuel composition comprising primarily paraffins, the method comprising:
    providing a diesel fuel composition comprising a quantity of one or more normal paraffins sufficient to produce a cetane number of 40 or higher , the normal paraffin content being less than about 99% by weight of the diesel fuel composition;
    providing the diesel fuel composition with an aromatic content of from about 0.5% to less than about 9% by weight, thereby producing a self-lubricating diesel fuel composition having a sulfur content of about 200 ppm or less and a coefficient of friction of less than 0.3 when tested using a high frequency reciprocating test rig at 60° C.; and,
    operating the engine comprising the fuel injector pump without component failure burning the self-lubricating diesel fuel composition.

15. The method of claim 14 wherein the reduced coefficient of friction is less than 0.25.

16. The method of claim 14 wherein the reduced coefficient of friction is less than 0.15.

17. The method of claim 14 wherein the self-lubricating diesel fuel composition comprises a sulfur content of less than about 100 ppm.

18. The method of claim 14 wherein the quantity of one or more normal paraffins is sufficient to produce a cetane number of about 50 or higher.

19. The method of claim 14 wherein the quantity of one or more normal paraffins is sufficient to produce a cetane number of about 60 or higher.

20. The method of claim 14 wherein the quantity of one or more normal paraffins is sufficient to produce a cetane number of about 65 or higher.

21. The method of claim 14 wherein the quantity of one or more normal paraffins is sufficient to produce a cetane number of about 70 or higher.

22. The method of claim 14 comprising providing the diesel fuel composition with an aromatic content of less than about 8% by weight of the diesel fuel composition.

23. The method of claim 14 comprising providing the diesel fuel composition with an aromatic content of less than about 3% by weight of the diesel fuel composition.

24. The self-lubricating diesel fuel composition of claim 1 further comprising lubricity enhancing additive.

25. The self-lubricating diesel fuel composition of claim 24 wherein the lubricity enhancing additive is fatty acid alkyl ester.

26. The self-lubricating diesel fuel composition of claim 25 wherein the fatty acid alkyl ester is selected from the group consisting of a fatty acid methyl ester and a fatty acid ethyl ester.

27. The self-lubricating diesel fuel composition of claim 14 further comprising lubricity enhancing additive.

28. The self-lubricating diesel fuel composition of claim 27 wherein the lubricity enhancing additive is fatty acid alkyl ester.

29. The self-lubricating diesel fuel composition of claim 27 wherein the fatty acid alkyl ester is selected from the group consisting of a fatty acid methyl ester and a fatty acid ethyl ester.

30. The self-lubricating diesel fuel composition of claim 1 wherein the sulfur content is less than about 80 ppm.

31. The self-lubricating diesel fuel composition of claim 1 wherein the sulfur content is less than about 50 ppm.

32. The method of claim 14 wherein the sulfur content is less than about 80 ppm.

33. The method of claim 14 wherein the sulfur content is less than about 50 ppm.

* * * * *